United States Patent
Malm

(10) Patent No.: US 7,395,079 B2
(45) Date of Patent: Jul. 1, 2008

(54) METHODS AND APPARATUS FOR SELECTIVELY PROCESSING INFORMATION REPLICAS

(75) Inventor: Peter Malm, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 197 days.

(21) Appl. No.: 11/016,167

(22) Filed: Dec. 17, 2004

(65) Prior Publication Data

US 2005/0250486 A1  Nov. 10, 2005

Related U.S. Application Data

(60) Provisional application No. 60/567,439, filed on May 4, 2004.

(51) Int. Cl.
*H04B 15/00* (2006.01)
(52) U.S. Cl. ...... 455/503; 455/502
(58) Field of Classification Search .......... 455/503, 455/501, 502
See application file for complete search history.

(56) References Cited

U.S. PATENT DOCUMENTS

| 6,128,355 | A * | 10/2000 | Backman et al. ........... 375/347 |
| 6,700,882 | B1 | 3/2004 | Lindoff et al. |
| 2002/0107987 | A1 | 8/2002 | Malm |
| 2003/0139140 | A1 | 7/2003 | Chen et al. |
| 2003/0207696 | A1* | 11/2003 | Willenegger et al. ........ 455/522 |
| 2007/0093272 | A1* | 4/2007 | Hovers et al. ............. 455/562.1 |

OTHER PUBLICATIONS

Multimedia Broadcast/Multicast Service (MBMS), Architecture and Functional Description (Release 6); Dec. 2002; pp. 1-114; 3GPP TS 23.846 V6.1.0; Third Generation Partnership Project.
Multiplexing and Channel Coding (FDD) (Release 5); Sep. 2003; pp. 1, 3-5, 57-63; 3GPP TS 25.212 V5.6.0; Third Generation Partnership Project.
Multimedia Broadcast/Multicast Service, Stage 1 (Release 6); Mar. 2004; pp. 1-17; 3GPP TS 22.146 V6.4.0; Third Generation Partnership Project.
Multimedia Broadcast/Multicast Service (MBMS), Architecture and Functional Description (Release 6); Mar. 2004; pp. 1-40; 3GPP TS 23.246 V6.2.0; Third Generation Partnership Project.
Introduction of the Multimedia Broadcast Multicast Service (MBMS) in the Radio Access Network (RAN), Stage 2 (Release 6); Mar. 2004; pp. 1-50; 3GPP TS 23.346 V6.0.0; Third Generation Partnership Project.

(Continued)

*Primary Examiner*—Duc M. Nguyen
*Assistant Examiner*—Eric J Elcenko
(74) *Attorney, Agent, or Firm*—Potomac Patent Group PLLC

(57) ABSTRACT

Simple and robust methods and apparatus for switching between different types of combining in a receiver in a communication system are disclosed that minimize Layer 1 processing overhead and power consumption. A method of selecting among a plurality of types of combining for received replicas of an information bitstream in a communication system includes the steps of determining a time offset between received replicas; determining a selection threshold; comparing the time offset with the selection threshold; and selecting one of the plurality of combining types based on the comparing step. The system may be a wideband code division multiple access system and the replicas may be included in a multimedia broadcast/multicast service.

7 Claims, 5 Drawing Sheets

OTHER PUBLICATIONS

P.J. Czerepinski et al., Coverage and Planning Aspects of MBMS in UTRAN, Oct. 2004, pp. 1-5, Fifth International Conference on 3G Mobile Communication Technologies, London, UK.

International Search Report, Jul. 27, 2005, pp. 1-4, PCT/ISA/210, EPO.

Written Opinion of the International Searching Authority, Jul. 27, 2005, pp. 1-6, PCT/ISA/237, EPO.

* cited by examiner

METHODS AND APPARATUS FOR SELECTIVELY PROCESSING INFORMATION REPLICAS

This application claims the benefit of U.S. Provisional Patent Application No. 60/567,439 filed on May 4, 2004, the entirety of which is incorporated here by reference.

BACKGROUND

This invention relates to communication devices and more particularly to communication devices that receive multiple replicas, sent from different transmitters, of the same information.

Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and wideband CDMA (WCDMA) telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS standard. This application focusses on WCDMA systems for economy of explanation, but it will be understood that the principles described in this application can be implemented in other digital communication systems.

WCDMA is based on direct-sequence spread-spectrum techniques, with pseudo-noise scrambling codes and orthogonal channelization codes separating base stations and physical channels (terminals or users), respectively, in the downlink (base-to-terminal) direction. User terminals communicate with the system through, for example, respective dedicated physical channels (DPCHs). WCDMA terminology is used here, but it will be appreciated that other systems have corresponding terminology. Scrambling and channelization codes and transmit power control are well known in the art.

FIG. 1 depicts a mobile radio cellular telecommunication system 10, which may be, for example, a CDMA or a WCDMA communication system. Radio network controllers (RNCS) 12, 14 control various radio network functions including for example radio access bearer setup, diversity handover, etc. More generally, each RNC directs mobile station (MS), or remote terminal, calls via the appropriate base station(s) (BSs), which communicate with each other through downlink (i.e., base-to-mobile or forward) and uplink (i.e., mobile-to-base or reverse) channels. RNC 12 is shown coupled to BSs 16, 18, 20, and RNC 14 is shown coupled to BSs 22, 24, 26. Each BS serves a geographical area that can be divided into one or more cell(s). BS 26 is shown as having five antenna sectors S1-S5, which can be said to make up the cell of the BS 26. The BSs are coupled to their corresponding RNCs by dedicated telephone lines, optical fiber links, microwave links, etc. Both RNCs 12, 14 are connected with external networks such as the public switched telephone network (PSTN), the Internet, etc. through one or more core network nodes like a mobile switching center (not shown) and/or a packet radio service node (not shown). In FIG. 1, MSs 28, 30 are shown communicating with plural base stations: MS 28 communicates with BSs 16, 18, 20, and MS 30 communicates with BSs 20, 22. A control link between RNCs 12, 14 permits diversity communications to/from MS 30 via BSs 20, 22.

At the UE, the modulated carrier signal (Layer 1) is processed to produce an estimate of the original information data stream intended for the receiver. The composite received baseband spread signal is commonly provided to a rake processor that includes a number of "fingers", or de-spreaders, that are each assigned to respective ones of selected components, such as multipath echoes or streams from different base stations, in the received signal. Each finger combines a received component with the scrambling sequence and the appropriate channelization code so as to de-spread the received composite signal. The rake processor typically de-spreads both sent information data and pilot or training symbols that are included in the composite signal.

FIG. 2 is a block diagram of a receiver 200, such as a mobile terminal in a WCDMA communication system, that receives radio signals through an antenna 202 and down-converts and samples the received signals in a front-end receiver (Fe RX) 204. The output samples are fed from Fe RX 204 to a rake combiner and channel estimator 206 that de-spreads the pilot channel, estimates the impulse response of the radio channel, and de-spreads and combines received echoes of the received data and control symbols. An output of the combiner/estimator 206 is provided to a symbol detector 208 that produces information that is further processed as appropriate for the particular communication system. Rake combining and channel estimation are well known in the art.

In order to accommodate the increasing demand for higher data rates in wireless user equipment (UE), such as cellular telephones, combination cellular telephones-personal digital assistants, and wireless-enabled personal computers, a high-speed downlink shared channel (HS-DSCH) was introduced in WCDMA. The HS-DSCH has a spreading factor of sixteen and can use several channelization codes simultaneously, with modulation being either quadrature phase shift keying (QPSK) or 16-ary quadrature amplitude modulation (16QAM). Each transmission time interval (TTI) includes one transport block, and the length of a TTI is three slots. After encoding, interleaving, and rate matching, the bits to be transmitted are distributed over one or more channelization codes. This is described in "Multiplexing and channel coding (FDD)", 3GPP Technical Specification (TS) 25.212 ver. 5.6.0 (September 2003), for example. Since the chip rate in a direct-sequence CDMA system is typically constant, a higher spreading factor generally corresponds to a lower information bit-rate.

A multimedia broadcast and multicast service (MBMS) for the frequency division duplex (FDD) aspect of the WCDMA system is being standardized by 3GPP. MBMS is described in 3GPP Technical Specification TS 23.246 ver. 6.2.0 Technical Specification Group Services and System Aspects; Multimedia Broadcast/Multicast Service (MBMS); Architecture and functional description (Release 6) (April 2003) and Technical Report TR 23.846 ver. 6.1.0 Technical Specification Group Services and System Aspects; Multimedia Broadcast/Multicast Service (MBMS); Architecture and functional description (Release 6) (December 2002), among other places.

MBMS is intended to offer high-speed and high-quality broadcast, or multicast, transmission to mobile stations (UEs). To enhance the quality and bit rate of the MBMS transmission, it has been agreed in 3GPP to use large interleaving depths, i.e., large TTIs, to obtain interleaving gain, and to use multicast on Layer 1, i.e., the UE should be able to receive multiple replicas of the same bitstream from different base stations, each of which is a Node B in 3GPP vocabulary.

It has also been agreed that UEs must be able to receive 128-kilobits-per-second (kbps) and 256-kbps bitstreams. The combination of long TTI, multicast on Layer 1, and bit rates as high as 128 kbps and 256 kbps results in very large buffer memory sizes for Layer 1 processing in the UE.

Further, it has been agreed that the UE should be able to do selective combining on the radio link control (RLC) level (Layer 2). This means that different bitstreams are separately processed on Layer 1, and the RLC entity selects transport blocks, called RLC protocol data units (PDUs), from the different streams based on whether they pass a cyclic redundancy check (CRC) or not. Instead of using RLC PDUs, selective combining can also be carried out between multiple antennas, polarization angles, etc. This kind of separate processing of bitstreams on Layer 1 also results in very large buffer sizes since all received bitstreams must be separately buffered. Selective combining is well known in the art.

Besides selective combining, another well-known combining technique is soft combining or maximum ratio combining. Soft combining, which UEs already perform on Layer 1, can save both buffer space and processing time since the bitstreams are combined early in the receiver chain and since the soft-combined bitstream is processed as one stream, not several. Soft combining is well known in the art, and is used by some kinds of turbo decoders and by hybrid automatic repeat request (HARQ) in high-speed downlink packet access (HSDPA) in 3G radio communication systems.

Generally, the buffer size required for soft combining increases linearly with the timing difference between the transmission links involved in a broadcast or multicast. On the other hand, the Layer 1 buffer size required for selective combining is substantially constant with timing differences. This and other differences between selective and soft combining have caused problems for UE designers, who have not been able to optimize their designs for both types of combining simultaneously.

SUMMARY

This invention presents simple and robust methods and apparatus for switching between soft combining and selective combining. Since the UE must be able to handle both soft combining and selective combining, a useful goal is to minimize the Layer 1 processing overhead incurred by selective combining and thereby minimize power consumption.

In one aspect of the invention, there is provided a method of selecting among a plurality of types of combining for received replicas of an information bitstream in a communication system. The method includes the steps of determining a time offset between received replicas; determining a selection threshold; comparing the time offset with the selection threshold; and selecting one of the plurality of combining types based on the comparing step.

In another aspect of the invention, there is provided an apparatus in a receiver in a communication system for selecting among a plurality of types of combining for replicas of an information bitstream received by the receiver. The apparatus includes a processor adapted to determine a time offset between received replicas, to determine a selection threshold, to compare a determined time offset with a determined selection threshold, and to select one of the plurality of combining types based on the comparison.

In yet another aspect of the invention, there is provided a computer-readable medium containing a computer program for selecting among a plurality of types of combining for received replicas of an information bitstream in a communication system. The computer program performs the steps of determining a time offset between received replicas; determining a selection threshold; comparing the time offset with the selection threshold; and selecting one of the plurality of combining types based on the comparing step.

BRIEF DESCRIPTION OF THE DRAWINGS

The several objects, features, and advantages of Applicant's invention will be understood by reading this description in conjunction with the drawings, in which.

DETAILED DESCRIPTION

Many receivers, such as those that handle the MBMS in a WCDMA communication system, have at least two options for processing different received replicas (bitstreams) of transmitted information. For example, the two options may be (1) selective combining of received bitstreams and (2) soft combining of the received bitstreams. The buffer size required for these two alternatives depends on the timing difference between the different bitstreams. This invention describes how to use the receiver's memory and processing capability efficiently by choosing selective combining or soft combining, depending on the timing difference.

It will be appreciated that the choice need not always be between only selective and soft combining. There may be variations on the soft combining theme, such as transport channel combining, in which soft values from different transport channels are soft-combined. There is no real difference between the described soft combining and such variations since the variations merely reorder the soft values to allow per-transport channel combination. Moreover, there may be other environments besides MBMS in WCDMA where choosing between combining types is useful.

Figure 3:
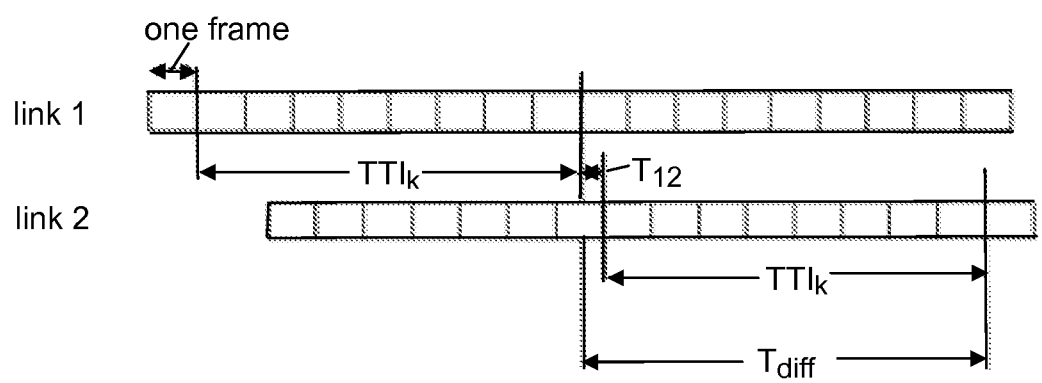
FIG. 3 depicts a timing model of a multimedia broadcast and multicast service.

A simplified timing model of an MBMS multicast with two communication links from different base stations is depicted in FIG. 3. In the figure, sequences of frames are depicted for a link 1 and a link 2, and it will be appreciated that each frame has a duration such as 10 milliseconds (ms) and typically includes a plurality of successive time slots, or bursts, during which information is sent. $T_{12}$ is the time offset between the end and start of the same TTIs from link 1 and link 2, and $T_{diff}$ is the time offset between $TTI_k$, the k-th TTI, from link 1 and $TTI_k$ from link 2. As may be seen from FIG. 3, it is not necessary to guarantee that the radio links are synchronized either on a radio-frame level or on the TTI level.

Figure 1:
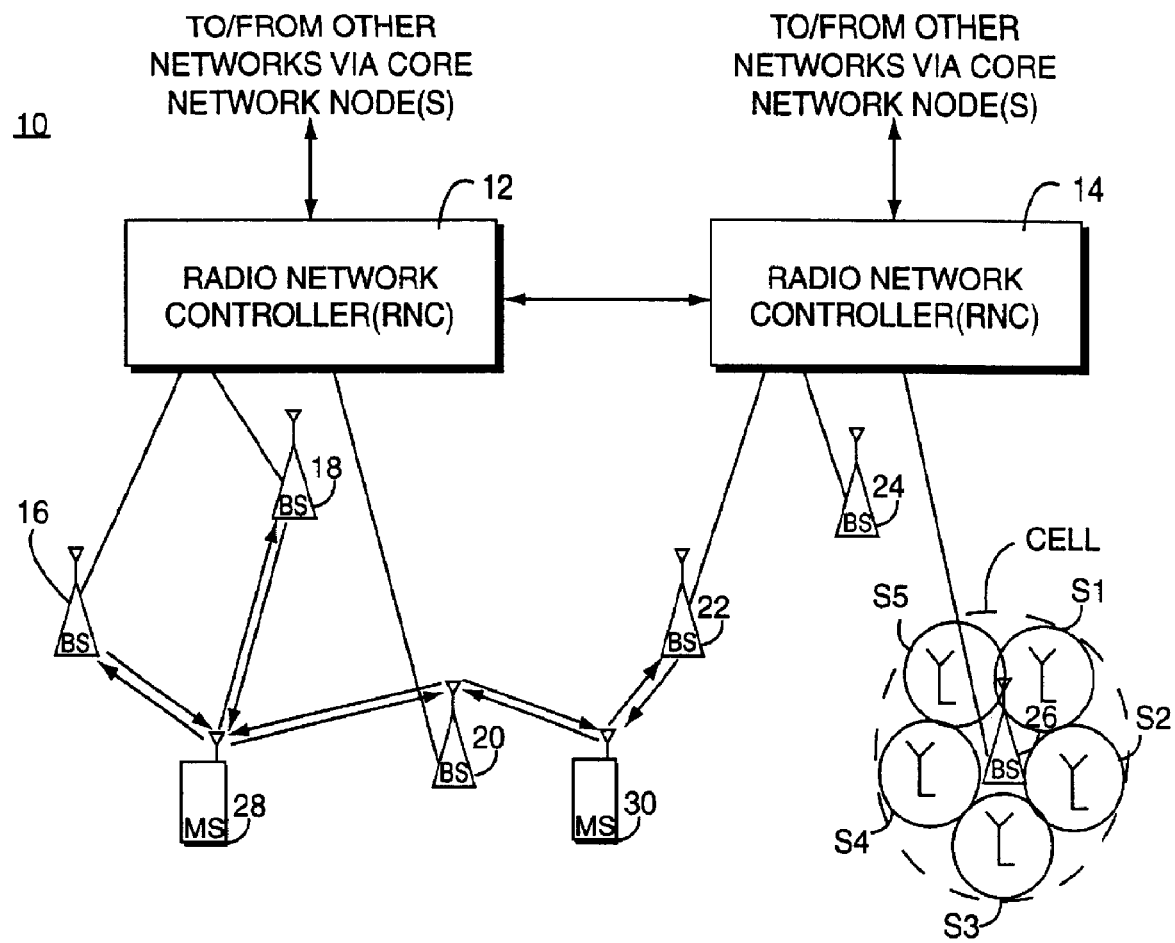
FIG. 1 depicts a telecommunication system.
Figure 2:
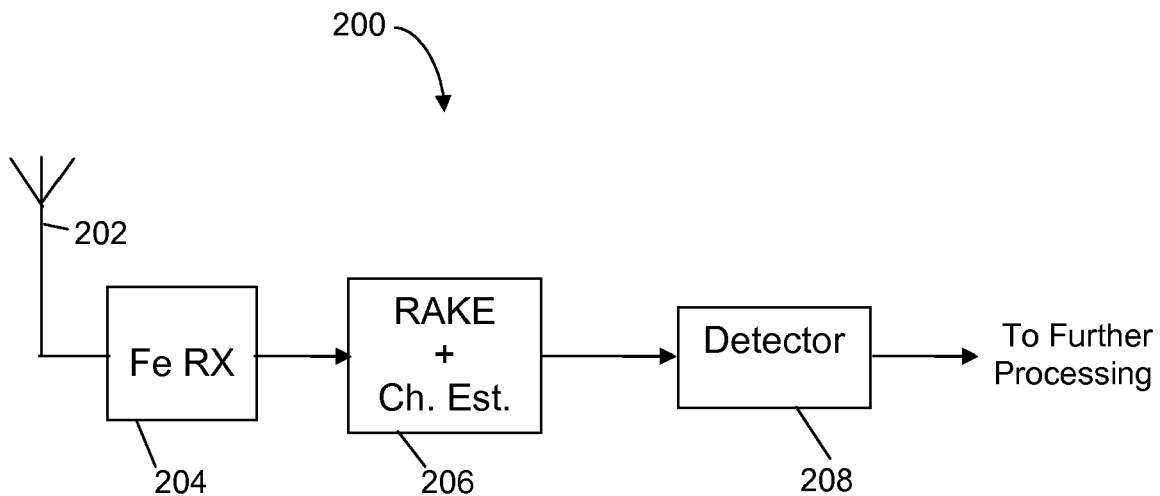
FIG. 2 is a block diagram of a receiver in a telecommunication system.
Figure 4:
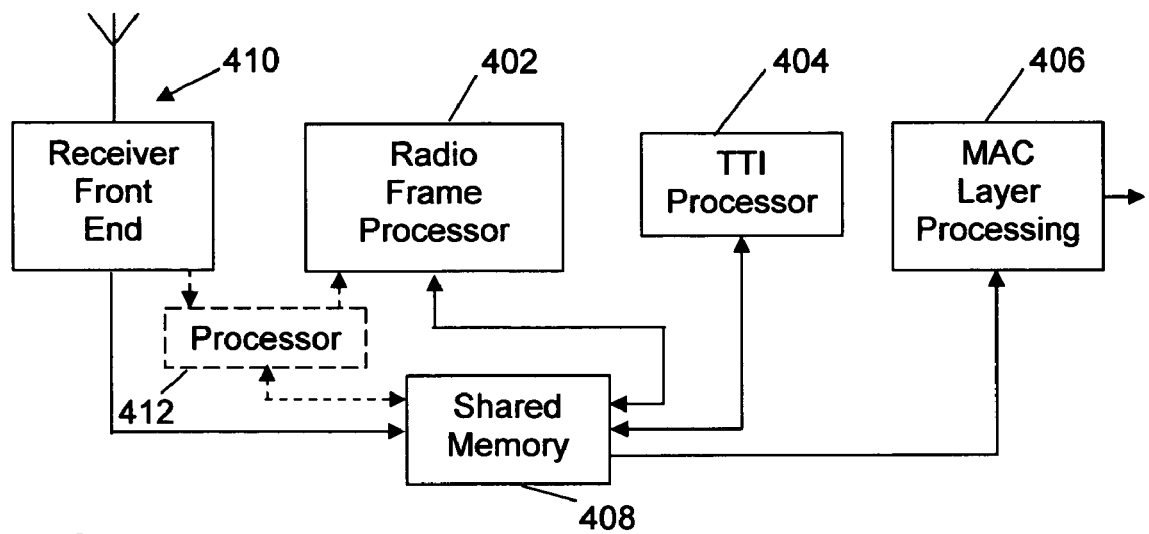
FIG. 4 is a block diagram of a user equipment, including a baseband architecture.

A block diagram of a portion of a UE, including a general model of a baseband architecture, is depicted in FIG. 4. As shown, the baseband processing in the UE includes three processing entities: a radio frame processor 402, a TTI processor 404, and a medium access control (MAC) layer processing 406. Communication between the entities 402, 404, 406 is advantageously done via a shared memory 408. Hence, an antenna and receiver front-end 410, which handles incoming multicast information and frequency-shifts it in an appropriate way to baseband, writes received bits, i.e., soft values, slot-wise into the shared memory 408 to build up sequences of radio frames. The frame processor 402 reads a radio frame from the memory 408 and writes the frame back into the shared memory 408 after its processing. The TTI processor 404 then reads one TTI at a time from the shared memory 408 and writes back processed data TTI-wise to the shared memory 408 before the data is transferred to MAC layer processing 406 and subsequent handling. It will be appreciated, of course, that this architecture is simply an example and that many other architectures are suitable. In addition, it will be recognized that the arrangement depicted in FIG. 2 is typically found in the receiver front end 410 in FIG. 4.

The shared memory 408 may itself store the contents of a frame during the time period that frame processing is done. Such operation is not necessary, but for purposes of explanation it leads to pessimistic, i.e., larger, buffer requirements. It is more efficient for the shared memory 408 to act as a frame buffer for the frame processor 402, which would read, process, and write back a number of soft values to the shared memory 408. After the soft values are written back to the shared memory by the frame processor, the values are typically considered to belong to the TTI processor, with the shared memory acting as a TTI buffer. In any case, the frame buffer (shared memory 408) may store a whole frame until it is completely processed by the frame processing entity 402.

It is readily found that the maximum buffer size for selective combining is required when $T_{12}=0$ for the architecture depicted in FIG. 4. In that case, information from one of the links must be stored while information from the other link is processed. In other cases, time is available to complete some frame processing before information from the other link arrives. It will be understood that providing multiple sets of frame/TTI/MAC processing entities in the UE can also reduce the maximum buffer size for selective combining.

Denoting frame processing time by $T_{frame}^P$, TTI processing time by $T_{TTI}^P$, and MAC processing time by $T_{MAC}^P$, the total buffer size $M_{max}^{SC}$ required for selective combining of $N_{link}=2$ radio links is given by:

$$M_{max}^{SC} = n \cdot 2 \frac{2560}{SF} N_{link}\left(15 + \frac{T_{frame}^P}{T_{slot}}\right) + \frac{n \cdot 2}{T_{slot}} \frac{2560}{SF}(T_{TTI} + T_{frame}^P) + R(T_{TTI} + T_{MAC}^P)$$

Eq. 1 where n is each soft value's width in bits, $T_{slot}$ is the time duration of one slot in ms, SF is a spreading factor, $T_{TTI}$ is the duration of one TTI in ms, and R is the MBMS data rate in bps.

If soft combining is done at the slot level, i.e., as early as possible in the receiver chain, then the total buffer size $$M_{max}^{soft}$$

for soft combining of two links is given by:

$$M_{max}^{soft} = n \cdot 2 \frac{2560}{SF}\left(\frac{T_{diff}}{T_{slot}} + 15 + \frac{T_{frame}^P}{T_{slot}}\right) + \frac{n \cdot 2}{T_{slot}} \frac{2560}{SF}(T_{TTI} + T_{frame}^P) + R(T_{TTI} + T_{MAC}^P)$$

Eq. 2

From Eq. 2, it can be seen that the soft combining buffer requirement $$M_{max}^{soft}$$

increases linearly with the time slip $T_{diff}$. From Eq. 1, it can be seen that this linear behavior is not found in selective combining due to the need to look at the maximum value, i.e., when $T_{12}=0$. Moreover, Applicant has recognized that $$M_{max}^{soft}$$

is smaller than $M_{max}^{SC}$ when $T_{diff}=0$, and thus there is a time-slip break-point, below which soft combining requires smaller buffer sizes than selective combining. Since soft combining already has much lower processing requirements and power consumption than selective combining, a UE that can determine when to use soft combining and when to use selective combining has several advantages over other UEs.

To find the time-slip break-point, Applicant sets $$M_{max}^{soft} < M_{max}^{SC}.$$

This gives:

$$T_{diff} < (N_{link} - 1)\left(T_{TTI} + T_{frame} + T_{frame}^P + T_{TTI}^P + \frac{T_{slot} \cdot SF}{2n \cdot 2560} R(T_{TTI} + T_{MAC}^P)\right)$$

Eq. 3 where $N_{link}=2, 3, \ldots$. Since the last term in Eq. 3 is typically small and since processing delays are usually small enough to be ignored, a convenient estimate is that if:

$$T_{diff} < (N_{link}-1)(T_{TTI}+T_{frame}) \text{ for } N_{link}=2, 3,$$

Eq. 4 then soft combining should be used. An important advantage of this estimate is that Eq. 4 contains only values that are known to the UE. The number of links $N_{link}$ and duration $T_{TTI}$ are signaled to the UE by the base stations, and the frame time $T_{frame}$, e.g., 10 ms, is a known parameter of the communication system. The time offset $T_{diff}$ may be determined by the rake combiner 206 or another suitable portion of the UE.

Accordingly, a processor in the receiver may execute instructions that implement a method of selecting between soft combining and selective combining received replicas of an information bitstream. The timing difference between two radio links is established by already existing hardware in a WCDMA terminal, which means that a device or devices for implementing Applicant's method exist today in UMTS. A processor for implementing the method may be any of the processors 402, 404, 406, or another suitable processor in the UE. For example, Applicant's timing offset calculation may be done by a processor 412 (shown in dashed lines) that is connected, in FIG. 4, to the receiver front end 410 and to the radio frame processor 402. Connection to the receiver front end 410 enables the processor to estimate the timing difference and connection to the radio frame processor 402 enables the processor to signal if the two radio link's soft values shall be processed separately or as combined soft values.

Figure 5:
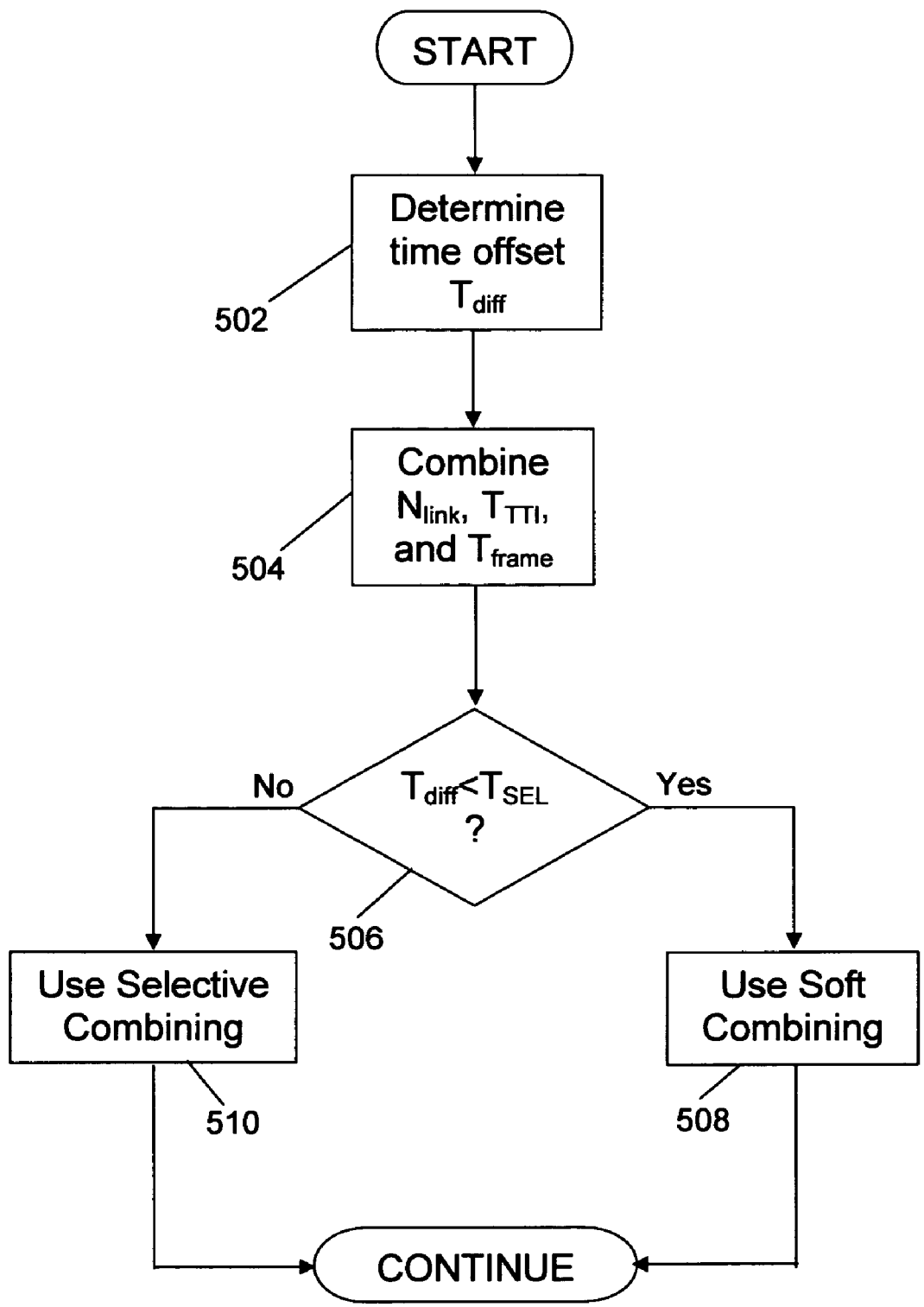
FIG. 5 is a flow chart of a method of selecting between soft combining and selective combining.

A method of selecting between soft and selective combining is depicted in FIG. 5. In step 502, the time offset $T_{diff}$ between received replicas is determined. In step 504, the known number of links $N_{link}$ transporting the replicas, the known duration $T_{TTI}$, and the known frame time $T_{frame}$ are combined according to Eq. 4. This combination may be considered a selection threshold $T_{SEL}$. In step 506, the time offset $T_{diff}$ is compared to the selection threshold $T_{SEL}$, and if $T_{diff}$ is less than or about equal to $T_{SEL}$, the processor causes the receiver to combine the replicas using soft combining (step 508). If $T_{diff}$ is greater than $T_{SEL}$, the processor causes the receiver to combine the replicas using selective combining (step 510). To the extent it is likely that the radio link timing does not change very often, it is currently believed that this procedure may be carried out once every few TTIs.

Figure 6:
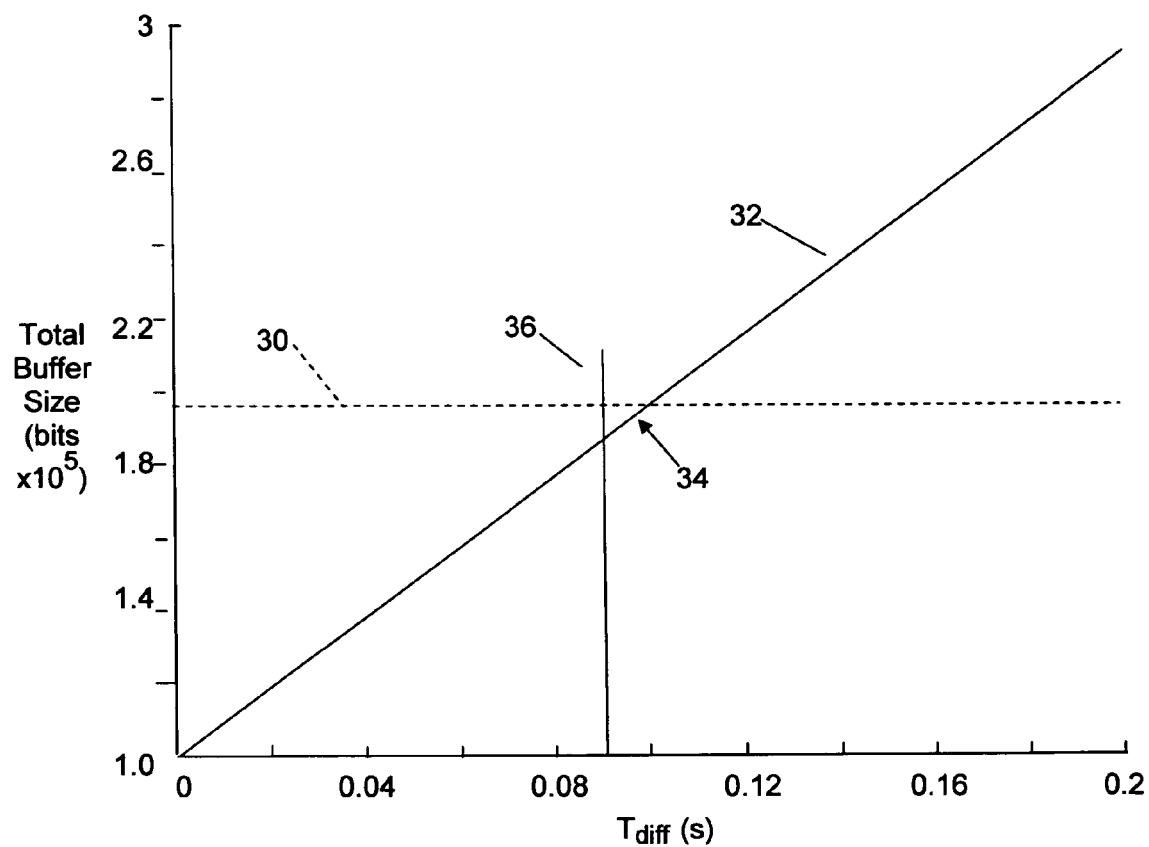
FIG. 6 illustrates a relationship between total buffer size and selective and soft combining.

FIG. 6 shows how buffer size first increases linearly with soft combining and then how the combining regime should be shifted to selective combining according to the selection threshold given by Eq. 4. In FIG. 6, $N_{link}=2$ and $T_{TTI}=80$ ms. The constant total buffer size $M_{max}^{SS}$ for selective combining (see Eq. 1) is depicted by the dashed line 30, and the linearly increasing total buffer size $$M_{max}^{soft}$$

for soft combining (see Eq. 2) is depicted by the line 32. The ideal break point is the point 34 at which the dashed line 30 and solid line 32 cross, which is at about $T_{diff}=0.10$ second (s) and a total buffer size of about $1.95\times10^5$ bits. Ideally, the UE should use soft combining (i.e., follow the solid line 32) to the left of the break point 34, i.e., when $0\leq T_{diff}\leq 0.10$ s, and the UE should use selective combining (i.e., follow the dashed line 30) to the right of the break point 34, i.e., when 0.10 s<$T_{diff}$.

FIG. 6 also indicates the break point estimated by Eq. 4 by the line 36, which is at about $T_{diff}=0.09$ s and a total buffer size of about $1.9\times10^5$ bits. From FIG. 6, it can be seen that the simple estimate of Eq. 4 is a little bit conservative in that the UE would use selective combining (which is more computationally burdensome) a little more than it has to (i.e., 0.09 s is a little bit less than 0.10 s), but the difference is quite small, and Eq. 4 has the significant implementation advantage over Eq. 3 of not requiring the UE to compute processing durations for different tasks, such as frame processing, TTI processing, and MAC delivery.

As stated above, an important benefit for the UE is that the processing load is minimized with soft combining. It will be appreciated that this benefit is substantial. Soft combining requires that the frame, TTI, and MAC delivery tasks are done only for the combined soft values. As soon as the UE resorts to selective combining, then frame, TTI, and MAC delivery tasks must be done for $N_{link}$ radio links. TTI processing includes several computationally intensive and time-consuming tasks, e.g., rate de-matching and Turbo decoding.

It will be appreciated that procedures described above are carried out repetitively as necessary, for example, to respond to time-varying characteristics of communication channels between transmitters and a receiver. To facilitate understanding, many aspects of Applicant's invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, Applicant's invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of selecting among a plurality of types of combining for received replicas of an information bitstream in a communication system, comprising the steps of:

determining, from received replicas, a time offset between the received replicas;

determining a selection threshold based on the received replicas;

comparing the time offset with the selection threshold;

selecting one of the plurality of combining types based on the comparing step; and combining the received replicas according to a combining type selected based on the comparing step;

wherein the selection threshold $T_{diff}$ is based on a number of links transporting the replicas, a transmission time interval, and a frame time and is given by $$T_{diff}<(N_{link}-1)(T_{TTI}+T_{frame})$$

where $N_{link}$ is the number of links transporting the replicas, $T_{TTI}$ is the transmission time interval, and $T_{frame}$ is the frame time.

2. The method of claim 1, wherein the plurality of combining types include soft combining and selective combining, and if the time offset is less than or about equal to the selection threshold, soft combining is selected.

3. An apparatus in a receiver in a communication system for selecting among a plurality of types of combining for replicas of an information bitstream received by the receiver, comprising:
a processor adapted to determine, from received replicas, a time offset between the received replicas, to determine a selection threshold based on the received replicas, to compare a determined time offset with a determined selection threshold, and to select one of the plurality of combining types based on the comparison;
wherein the received replicas are combined according to a combining type selected based on the comparison; the processor is adapted to determine the selection threshold based on a number of links transporting the replicas, a transmission time interval, and a frame time; and the selection threshold $T_{diff}$ is given by $$T_{diff}<(N_{link}-1)(T_{TTI}T_{frame})$$

where $N_{link}$ is the number of links transporting the replicas, $T_{TTI}$ is the transmission time interval, and $T_{frame}$ is the frame time.

4. The apparatus of claim 3, wherein the plurality of combining types include soft combining and selective combining, and if the time offset is less than or about equal to the selection threshold, soft combining is selected.

5. The apparatus of claim 4, wherein the communication system is a wideband code division multiple access system and the replicas are included in a multimedia broadcast/multicast service.

6. A computer-readable medium encoded with a computer program for selecting among a plurality of types of combining for received replicas of an information bitstream in a communication system, wherein the computer program when executed causes the computer to perform the steps of:
determining, from received replicas, a time offset between the received replicas;
determining a selection threshold based on the received replicas;
comparing the time offset with the selection threshold; and
selecting one of the plurality of combining types based on the comparing step;
wherein the selection threshold $T_{diff}$ is based on a number of links transporting the replicas a transmission time interval, and a frame time and the selection threshold is given by $$T_{diff}<(N_{link}-1)(T_{TTI}+T_{frame})$$

where $N_{link}$ is the number of links transporting the replicas, $T_{TTI}$ is the transmission time interval, and $T_{frame}$ is the frame time.

7. The computer-readable medium of claim 6, wherein the plurality of combining types include soft combining and selective combining, and if the time offset is less than or about equal to the selection threshold, soft combining is selected.

* * * * *